United States Patent
Urac et al.

(10) Patent No.: US 10,107,307 B2
(45) Date of Patent: Oct. 23, 2018

(54) GAS TURBINE ENGINE ROTOR CASING TREATMENT

(71) Applicant: PRATT & WHITNEY CANADA CORP., Longueuil (CA)

(72) Inventors: Tibor Urac, Mississauga (CA); Peter Townsend, Mississauga (CA); Ignatius Theratil, Mississauga (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 289 days.

(21) Appl. No.: 14/686,010

(22) Filed: Apr. 14, 2015

(65) Prior Publication Data
US 2016/0305285 A1 Oct. 20, 2016

(51) Int. Cl.
F04D 29/68 (2006.01)

(52) U.S. Cl.
CPC ................... F04D 29/685 (2013.01)

(58) Field of Classification Search
CPC ...................................... F04D 29/685
USPC .......................................... 416/181
See application file for complete search history.

(56) References Cited

U.S. PATENT DOCUMENTS

| | | | |
|---|---|---|---|
| 4,239,452 A | 12/1980 | Roberts, Jr. | |
| 4,540,335 A * | 9/1985 | Yamaguchi | F01D 7/00 415/129 |
| 4,767,266 A | 8/1988 | Holz et al. | |
| 4,858,721 A | 8/1989 | Autie et al. | |
| 5,308,225 A * | 5/1994 | Koff | F01D 11/08 415/57.3 |
| 5,707,206 A * | 1/1998 | Goto | F01D 11/10 415/173.1 |
| 6,234,747 B1 * | 5/2001 | Mielke | F01D 11/08 415/119 |
| 6,499,940 B2 | 12/2002 | Adams | |
| 8,177,494 B2 * | 5/2012 | Ward | F01D 11/122 415/173.1 |
| 8,257,022 B2 | 9/2012 | Guemmer | |
| 8,337,146 B2 | 12/2012 | Yu | |
| 8,602,720 B2 | 12/2013 | Goswami et al. | |
| 8,777,558 B2 | 7/2014 | Brunet et al. | |
| 2005/0058541 A1 * | 3/2005 | Le Biez | F01D 5/145 415/173.4 |
| 2007/0059178 A1 * | 3/2007 | Shapiro | F01D 11/08 416/181 |
| 2007/0147989 A1 | 6/2007 | Collins | |
| 2008/0044273 A1 * | 2/2008 | Khalid | F04D 29/164 415/57.4 |

(Continued)

FOREIGN PATENT DOCUMENTS

EP 0774050 3/1999

*Primary Examiner* — Aaron R Eastman
(74) *Attorney, Agent, or Firm* — Norton Rose Fulbright Canada LLP

(57) ABSTRACT

An annular casing for a rotor of a gas turbine engine includes a casing treatment having at least one groove defined in the annular casing wall with an open end defined in an inner surface of the annular casing wall, and a perforated sheet overlapping the open end of the at least one groove. The perforated sheet includes a plurality of apertures therethrough in fluid communication with the at least one groove. A method of reducing flow losses through a flow path having a rotor with a plurality of rotating blades extending therethrough is also presented.

16 Claims, 4 Drawing Sheets

(56) References Cited

U.S. PATENT DOCUMENTS

2009/0067994 A1\* 3/2009 Pietraszkiewicz ...... F01D 11/08
 415/173.1
2009/0246007 A1\* 10/2009 Johann .................. F04D 29/685
 415/182.1
2011/0311354 A1\* 12/2011 Goswami ................ F01D 11/08
 415/182.1

\* cited by examiner

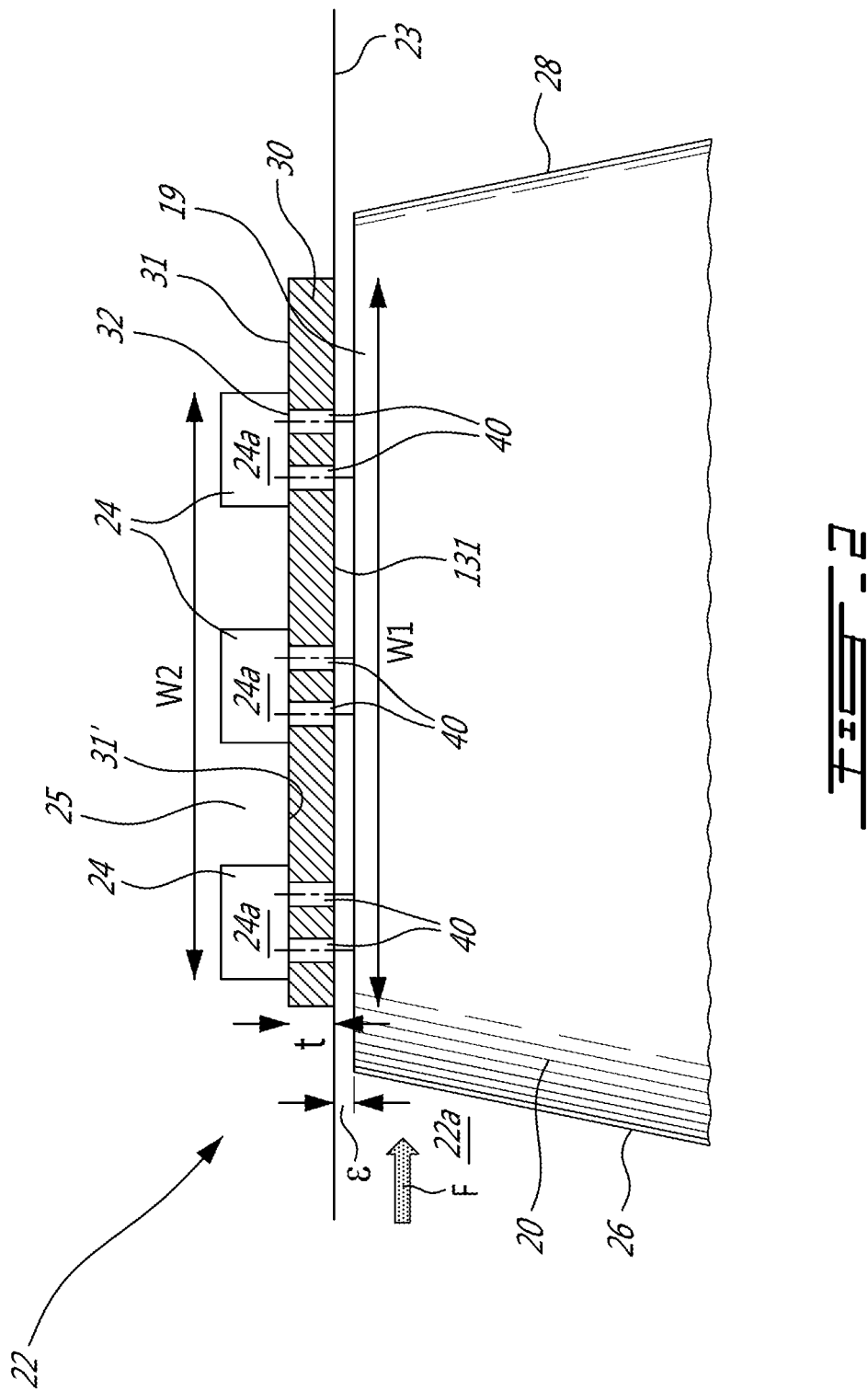

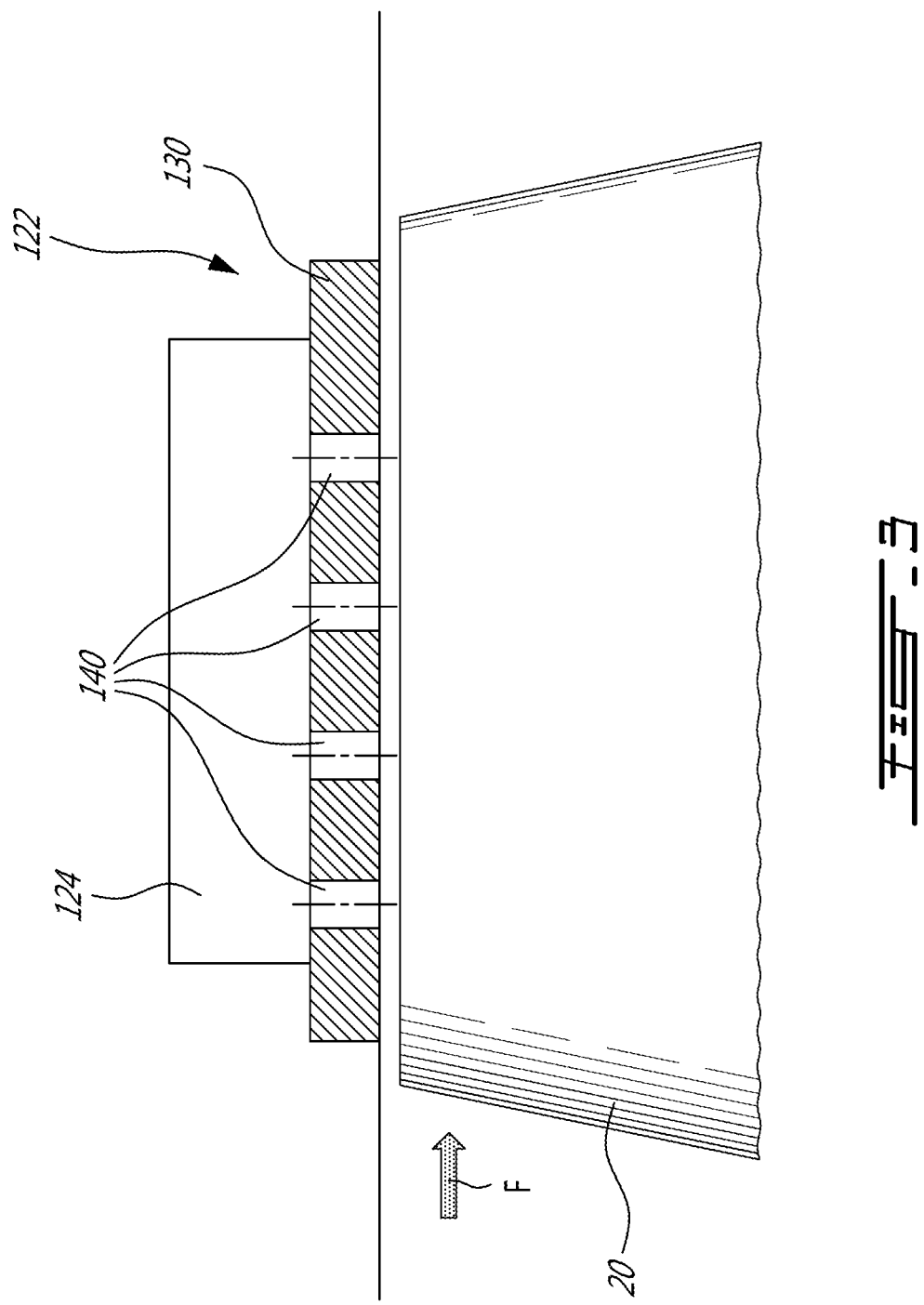

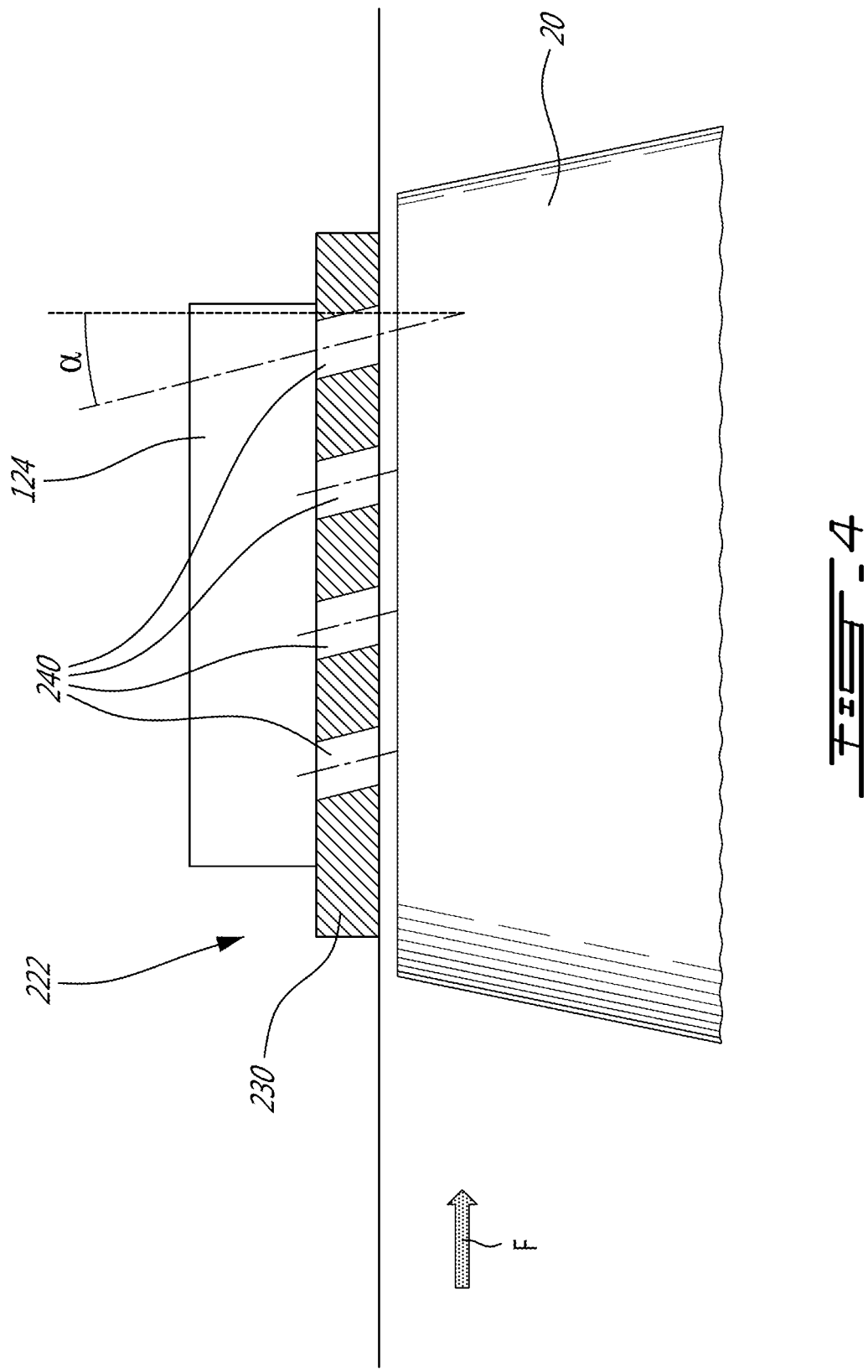

GAS TURBINE ENGINE ROTOR CASING TREATMENT

TECHNICAL FIELD

The application relates generally to gas turbine engines and, more particularly, to casings and casing treatments in rotors of gas turbine engines.

BACKGROUND

Casing treatments in the casing walls surrounding compressor rotors in gas turbine engines may be used to improve the surge margin. A common type of casing treatment includes the formation of circumferential grooves in the inner surface of the casing wall. The grooves may allow the flow of air to pass over the blade tip, which in turn may enable momentum exchange to energize tip flow as stall is approached. However, the grooves may create losses in the compressor that may impact compressor efficiency.

SUMMARY

In one aspect, there is provided an annular casing for a rotor of a gas turbine engine, the casing comprising: an annular casing wall having a casing treatment including: at least one groove defined in the annular casing wall, the at least one groove having an open end defined in an inner surface of the annular casing wall; and a perforated sheet overlapping the open end of the at least one groove, the perforated sheet including a plurality of apertures defined therethrough in fluid communication with the at least one groove.

In another aspect, there is provided a gas turbine engine comprising: a rotor having a plurality of blades extending in a flow path, each blade having a blade tip; and an annular casing wall surrounding the rotor and spaced from each blade tip by a clearance, the annular casing wall having a casing treatment including: at least one groove defined in the annular casing wall; and a porous structure disposed between the at least one groove and each blade tip, the porous structure providing fluid communication between the at least one groove and the flow path.

In a further aspect, there is provided a method of reducing flow losses in a casing treatment of a wall of the gas turbine engine around rotatable blades, the method comprising: covering at least a portion of the casing treatment with a porous structure in fluid communication with the portion of the casing treatment.

DESCRIPTION OF THE DRAWINGS

Reference is now made to the accompanying figures in which:

FIG. 2 is a schematic cross-sectional view of a portion of a blade and of a casing wall of a compressor rotor according to an embodiment, which may be used in a gas turbine engine such as the gas turbine engine of FIG. 1;

FIG. 3 is a schematic cross-sectional view of a portion of a blade and of a casing wall for a compressor rotor according to another embodiment; and FIG. 4 is a schematic cross-sectional view of a portion of a blade and of a casing wall for a compressor rotor according to yet another embodiment.

DETAILED DESCRIPTION

Figure 1:
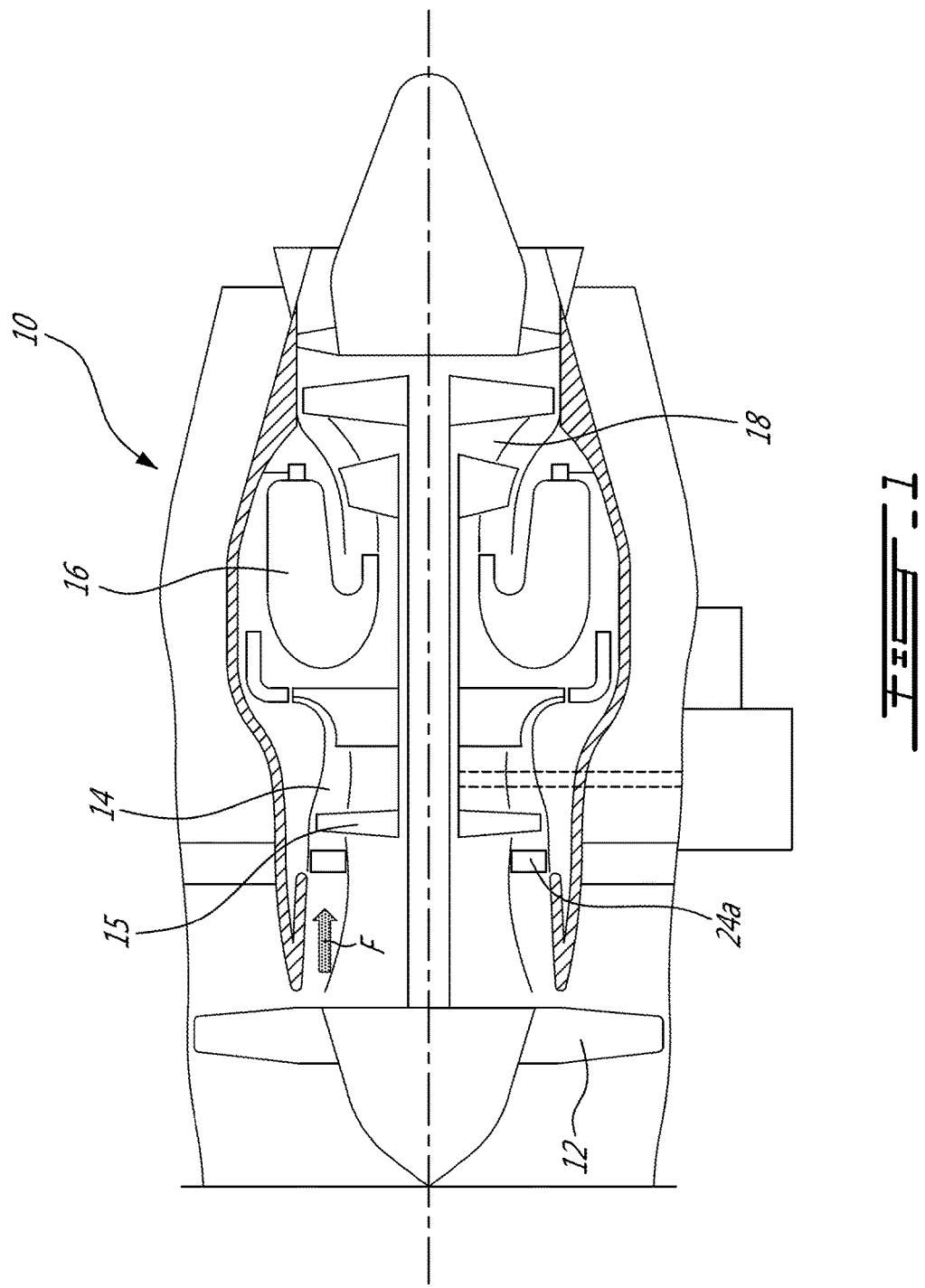
FIG. 1 is a schematic cross-sectional view of a gas turbine engine.

FIG. 1 illustrates an example of a gas turbine engine 10 of a type preferably provided for use in subsonic flight, generally comprising in serial flow F communication a fan 12 through which ambient air is propelled, a compressor section 14 for pressurizing the air including at least one compressor rotor 15, a combustor 16 in which the compressed air is mixed with fuel and ignited for generating an annular stream of hot combustion gases, and a turbine section 18 for extracting energy from the combustion gases.

Turning to FIG. 2, a tip 19 of a blade 20 of the compressor rotor 15 is shown with a cross-section of a casing wall 22 surrounding the compressor rotor 15.

The casing wall 22 is annular and spaced from the tips 19 of the blades 20 of the compressor rotor 15 by a radial clearance $\varepsilon$. The casing wall 22 is typically made of metal, for example stainless steel. The casing wall 22 has a casing treatment including at least one groove 24 defined in the casing wall 22 such that an open end 32 of the groove 24 is in an inner surface 23 of the casing wall 22. The groove(s) 24 face the blades 20 of the compressor rotor 15, and allow flow F of gases (e.g. compressed air) to pass over the blade tip 19 to enable momentum exchange so as to energize the tip flow F as stall is approached. When the casing treatment includes a plurality of grooves 24, the grooves 24 define protrusions 25 therebetween. In the example shown in FIG. 2, the casing wall 22 includes three circumferential grooves 24, while in the example shown in FIG. 3, a casing wall 122 includes only one circumferential groove 124. The casing wall 22 could include various numbers of grooves 24 depending on the flow F desired. The grooves 24 may extend along the circumferential direction and be axially spaced apart, or extend at any angle with respect to the circumferential direction of the casing wall 22; for example, the grooves may extend along the axial direction of the casing wall 22 and be circumferentially spaced apart (not shown). The grooves 24 could also be helicoidal grooves. The grooves 24 may be formed annularly in the casing wall 22, or each extend only along a portion of the circumference of the casing wall 22. The grooves 24 may have various cross-sectional shapes and sizes depending on a desired effect of the grooves 24 on the flow F. In the example shown in FIG. 2, the grooves 24 have a square rectangular cross-section, but it is contemplated that they could have any other appropriate cross-sectional shape, including, but not limited to, square, triangular, and any shape defined by curved walls. The grooves 24 are disposed along axially in a region of the casing wall 22 that typically extends between the leading edges 26 and trailing edges 28 of the blades 20, and the assembly of the grooves 24 together define an axial width W2.

The casing treatment further includes a porous structure 30 disposed radially between the blades tips 19 and the grooves 24. The porous structure 30 provides fluid communication between an inside 24a of the grooves 24 with the flow path 22a of the rotor. In the illustrated embodiment, the porous structure 30 is a perforated sheet. In one embodiment, the porous structure 30 is disposed in a recess 31 defined in the casing wall 22. The recess 31 is located radially outwardly of the blade tips 19, and has in one embodiment a larger axial width W1 than the axial width W2 of the assembly of the grooves 24. The porous structure 30 overlaps the open ends 32 of the grooves 24 which are defined in the recess 31, and the tip clearances is defined between the porous structure 30 and the tips 19 of the blades 20. In the example shown in FIG. 2, the porous structure 30 contacts the protrusions 25 defined between the grooves 24. As shown in FIG. 2, the porous structure 30 contacts and abuts against a recessed surface 31' that is radially outwardly offset from the inner surface 23 of the casing wall 23. It is however contemplated that a clearance could exist between the protrusions 25 and the porous structure 30. It is also contemplated that the porous structure 30 could be connected to the protrusions 25 defined between the grooves 24.

The porous structure 30 may be monolithic, or formed from a plurality of adjacent perforated sheets 30 to overlap the grooves 24. The porous structure 30 may be made of various materials depending on its use. For example, in hotter stages of the compressor section 14, the porous structure 30 may be made of stainless steel, while in cooler stages of the compressor section 14, the porous structure 30 may be made of aluminum. The porous structure 30 may also be made of a composite material. The porous structure 30 may also be made of an abradable material, or include an abradable material 131 on its inner surface extending adjacent the blade tips 19.

The porous structure 30 may be fastened to the casing wall 22 using various techniques. For example, should the porous structure 30 be a composite, the perforated sheet could be bonded to the casing wall 22. In another example, the porous structure 30 could be welded or brazed to the casing wall 22. The porous structure 30 could also be integrally formed with the casing wall 22, for example using casting, metal injection molding techniques, or additive manufacturing, such that the porous structure 30 and casing wall 22 are part of a monolithic structure.

The porous structure 30 may be annular and circumferentially overlap the open ends 32 of the grooves 24 around the entire circumference of the casing wall 22. Alternatively, the porous structure 30 could only overlap the open ends 32 of the grooves 24 around only a portion of the circumference of the casing wall 22. The porous structure 30 could also include multiple radially superposed layers in fluid communication with one another.

In the embodiment shown, the porous structure 30 is a sheet including a plurality of apertures 40 extending through a thickness t of the porous structure 30. The apertures 40 provide a porosity to the sheet 30 such that the flow F may penetrate the grooves 24 via the apertures 40. The apertures 40 may allow pressure to equilibrate with the grooves 24 so as to improve surge margin, while the rest of the porous structure 30 may prevent or reduce a disruption of the flow F caused by the presence of the grooves 24. The porous structure 30 may thus allow the flow F to benefit from the grooves 24 while mitigating the flow losses introduced by the presence of the grooves 24.

The apertures 40 may have various shapes, including, but not limited to, a circular cross-section, a rectangular or square cross-section. A size, shape and number of the apertures 40 may vary depending on characteristics of the flow around the rotor blades. In a particular embodiment, the open area defined by the apertures 40 is selected such as to be large enough to obtain an adequate pressure distribution across the porous structure, but small enough to provide a desired mitigation of the losses associated with flow F disruption by the grooves 24, and to provide for sufficient structural integrity of the porous structure 30 while in use. In one embodiment, a surface area of the apertures 40 is at least 10% of a surface area of a perforated sheet. In one embodiment, a surface area of the apertures 40 is at most 60% of a surface area of a perforated sheet. It is also contemplated that different apertures 40 (in size, shapes and/or distribution) may be used at different stages of the compressor section 14.

A repartition or distribution of the apertures 40 on the porous structure 30 may also vary circumferentially and axially. For example, in the embodiment of FIG. 3 where the porous structure 130 overlaps a single groove 124, the apertures 140 are axially equidistantly disposed; alternately, the apertures 140 may be irregularly spaced apart. In the embodiment of FIG. 2, the apertures 40 of the porous structure 30 disposed in axially spaced groups with the apertures of a group being closer to one another than the distance between adjacent groups, such as to be defined in alignment with the open ends 32 of the grooves 24 and not with the protrusions 25. Other configurations are also possible, including having apertures aligned with the protrusions.

In the examples shown in FIGS. 2-3, the apertures 40 extend along the radial direction of the casing wall 22. It is also contemplated that the apertures extend at a non-zero angle with respect to the radial direction of the casing wall For example, FIG. 4 shows an example of porous structure 230 of a casing wall 222 having apertures 240 extending at an angle α with respect to the casing wall 222. In one embodiment, the angle α has a value up to 70 degrees. Although the apertures 240 are depicted as leaning against the direction of the flow F, alternately, the apertures could be angled in the other direction such as to lean in the direction of the flow F and the apertures could be angled to lean in the circumferential direction.

The apertures 40, 140, 240 may be formed in the porous structure 30, 130, 230 using various processes. For example, the apertures 40 could be punched.

In use, compressor surge margin may be enhanced by directing the flow radially outwardly of the blade tips through the porous structure surrounding the blades, directing the flow from the porous structure into the groove(s), and directing at least part of the flow from the groove(s) back into the flow path to energize the tip flow as stall is approached. Pressure loss may be minimized by defining the porous structure to control the amount and direction of flow.

The above description is meant to be exemplary only, and one skilled in the art will recognize that changes may be made to the embodiments described without departing from the scope of the invention disclosed. For example, the porous structure could be used in a casing treatment of a turbine stage, a fan or a boost compressor of the gas turbine engine. Other modifications which fall within the scope of the present invention will be apparent to those skilled in the art, in light of a review of this disclosure, and such modifications are intended to fall within the appended claims.

The invention claimed is:

1. An annular casing for a rotor of a gas turbine engine, the annular casing comprising:
   an annular casing wall having a casing treatment, an inner surface of the annular casing wall surrounding a flow path, the casing treatment including:
   a recess extending radially outwardly from the inner surface of the annular casing wall, the recess circumferentially bounded by a recessed surface radially outwardly offset from the inner surface;
   at least one groove defined in the annular casing wall and extending radially outwardly from the recessed surface, the at least one groove having an open end defined in the recessed surface and an opposed closed end; and
   a perforated sheet disposed in the recess and overlapping the open end of the at least one groove, the perforated sheet abutting against the recessed surface and extending radially inwardly from the recessed surface, the perforated sheet including a plurality of apertures extending through a thickness of the perforated sheet, the plurality of apertures providing fluid communication between the at least one groove and the flow path.

2. The casing of claim 1, wherein the at least one groove is a circumferential groove.

3. The casing of claim 1, wherein the perforated sheet is an annular sheet.

4. The casing of claim 1, wherein the plurality of apertures extend along a radial direction of the casing wall.

5. The casing of claim 1, wherein the plurality of apertures extend at a non-zero angle relative to a radial direction of the casing wall.

6. The casing of claim 1, wherein the perforated sheet is monolithic.

7. The casing of claim 1, wherein the perforated sheet overlaps a plurality of the at least one groove, a plurality of protrusions being defined in the casing wall between adjacent grooves of the plurality of the grooves, and the perforated sheet contacts the plurality of protrusions.

8. A gas turbine engine comprising:
a rotor having a plurality of blades extending in a flow path, each blade having a blade tip; and
an annular casing wall surrounding the rotor and spaced from each blade tip by a clearance, the annular casing wall having a casing treatment, an inner surface of the annular casing wall surrounding the flow path, the casing treatment including:
a recess extending radially outwardly from the inner surface of the annular casing wall, the recess circumferentially bounded by a recessed surface radially outwardly offset from the inner surface;
at least one groove defined in the annular casing wall and extending radially outwardly from the recessed surface, an open end of the at least one groove defined in the recessed surface, the at least one groove having a closed end opposite to the open end thereof; and
a perforated sheet disposed in the recess between the at least one groove and each blade tip, the perforated sheet abutting against the recessed surface and extending radially inwardly from the recessed surface, the perforated sheet including a plurality of apertures extending through a thickness of the perforated sheet and providing fluid communication between the at least one groove and the flow path.

9. The gas turbine engine of claim 8, wherein the perforated sheet is annular.

10. The gas turbine engine of claim 8, wherein the at least one groove is a circumferential groove.

11. The gas turbine engine of claim 8, wherein the plurality of apertures extend along a radial direction of the annular casing wall.

12. The gas turbine engine of claim 8, wherein the plurality of apertures extend at a non-zero angle relative to a radial direction of the annular casing wall.

13. The gas turbine engine of claim 8, wherein the rotor is a compressor rotor.

14. A method of reducing flow losses in a casing treatment of a wall of a casing disposed around rotatable blades of a gas turbine engine, the method comprising:
covering at least a portion of the casing treatment with a perforated sheet inserted in a recess extending radially outwardly from an inner surface of the wall to a recessed surface, the perforated sheet abutting against the recessed surface circumferentially bounding the recess and radially outwardly offset from the inner surface, the perforated sheet extending radially inwardly from the recessed surface, the perforated sheet in fluid communication with the portion of the casing treatment, the casing treatment comprising at least one groove having a closed bottom end.

15. The method of claim 14, further comprising directing a flow radially outwardly of tips of the blades through the perforated sheet surrounding the blades, directing the flow from the perforated sheet into the at least one groove of the casing treatment, the at least one groove extending radially outwardly of the perforated sheet, and directing at least part of the flow from the at least one groove back through the perforated sheet.

16. The method of claim 15, wherein directing the flow through the perforated sheet comprises directing the flow through a plurality of apertures extending through a thickness of the perforated sheet.

* * * * *